United States Patent [19]
Navé et al.

[11] Patent Number: 5,566,266
[45] Date of Patent: Oct. 15, 1996

[54] OPTICAL FIBER SERVICE CABLE

[75] Inventors: Samuel D. Navé, Conover; Harvey R. McDowell, III, Hickory, both of N.C.

[73] Assignee: Siecor Corporation, Hickory, N.C.

[21] Appl. No.: 378,695

[22] Filed: Jan. 26, 1995

[51] Int. Cl.$^6$ ........................................... G02B 6/44
[52] U.S. Cl. ........................... 285/113; 385/109; 385/114
[58] Field of Search ..................................... 385/100–115

[56] References Cited

U.S. PATENT DOCUMENTS 5,199,096  3/1993  Kathiresan et al. .................... 385/109
5,243,675  9/1993  Kathiresan et al. .................... 385/109

*Primary Examiner*—John D. Lee
*Assistant Examiner*—Phan T. H. Palmer
*Attorney, Agent, or Firm*—J. David Abernethy

[57] ABSTRACT

An optical service cable includes a core tube containing a stack of optical ribbons and a filling compound. The filling compound may include a flame-retardant material, such as magnesium hydroxide or aluminum trihydrate.

15 Claims, 4 Drawing Sheets

OPTICAL FIBER SERVICE CABLE

BACKGROUND OF THE INVENTION

This invention relates to an optical fiber service cable. The cable may serve as a buried service cable in a local area network to extend from the outdoor environment to customer premises.

Optical service cables, sometimes called drop cables, must differ somewhat in design from typical indoor cables and outdoor cables in that they must be operable both in the outdoor environment, where the optical fibers must be protected from deleterious effects resulting from water ingress, and the indoor environment, in which the cable must pass tests to ensure that it does not rapidly spread flames from one part of the building to another through a riser duct. The UL-1666 vertical flame test is commonly used for this purpose. The fluid waterblocking compositions often used in cables for outdoor applications must be compensated for in order for a cable to pass the required flame test. A service cable designed to meet these problems is U.S. Pat. No. 4,892,282 which issued on Jan. 9, 1990 in the names of Christopher A. Story and Susan M. Cooper. The Story et al. cable includes a core tube made of a flame-resistant material such as a thermoplastic rubber enclosing individual coated optical fibers and a filling compound. The core tube is surrounded by a tensile layer of densely packed loose fiberglass yarns, and water swellable powder may be applied thereover. A layer of fiber reinforced plastic members for compressive strength surrounds the loose fiberglass yarn layer, and is enclosed in a sheath of flame-resistant material.

Another service cable is disclosed in U.S. Pat. No. 5,050,957, which also provides a flame-retardant outer sheath, a core tube holding individual coated optical fibers, and a strength member system between the sheath and the core tube. Waterblocking yarns are also present. An alternate embodiment includes a waterblocking tape and a metallic tape layer.

U.S. Pat. No. 5,343,549, which issued Aug. 30, 1994 in the names of Samuel D. Navé and Harvey R. McDowell, III, includes an outer flame resistant jacket over multiple layers of buffer tubes containing individual optical fibers and filling compound which are stranded about a central tensile member. Between the outer buffer tube layer and the outer jacket is a system including a flame resistant tape between layers of aramid yarns.

Optical fiber ribbon cables are also used in today's telecommunication networks. Ribbon cables are sometimes thought to be desirable, especially where it is important to gang splice many optical fiber connections in a short time. U.S. Pat. No. 5,293,443, which issued Mar. 8, 1994 in the names of Christopher K. Eoll et al. discloses an optical fiber cable having buffer tubes stranded around a central member, the buffer tubes holding optical ribbons and a filling compound. The Eoll et al. cable is not disclosed to be suitable for an indoor environment and does not disclose flame retardance as an object of the cable.

What is desired and seemingly is not provided by the prior art is an optical fiber ribbon service cable including both flame retardance and waterblocking provisions. The prior art also seemingly has not provided filling compounds including flame-retardant materials in optical service cables.

SUMMARY OF THE INVENTION

The foregoing problems of the prior art have been overcome with the optical fiber ribbon cable of this invention, which is suitable for buried and riser or plenum use in a local area network. The cable includes a plastic core tube enclosing at least one optical ribbon. Typically, the core tube holds a stack of up to eighteen optical ribbons each holding up to twelve coated optical fibers surrounded by a common ribbon coating, which may be formed of a material curable by ultraviolet light. The core tube also encloses a waterblocking filling compound, which may be a grease composition. The waterblocking filling compound effectively blocks entry of water into the core while minimizing optical loss to the cable. The core tube loosely surrounds the ribbon stack and preferably is of a single layer construction of polypropylene. A dual layer construction in which the outer layer is polybutylene terepthlate (PBT) and the inner layer is polycarbonate may also be used. Stranded about the core tube is a layer of discrete resin impregnated fiberglass strength members. Surrounding the strength members is a system comprising a polyimide tape, which acts as a flame barrier, between optional aramid fiber layers. A tape comprising a superabsorbent material may optionally be included in the system as well. Stranded about the tape and superabsorbent material is a layer of discrete resin impregnated fiberglass antibuckling members. If desired, a metallic tape for protection against gnawing by rodents, mechanical protection, and underground location may be included. Completing the cable is an outer jacket made of a flame retardant material.

Cables according to the invention may also include optical transmission members such as individual coated light waveguides in the core tube accompanied by modern filling compounds containing materials such as magnesium hydroxide or aluminum trihydrate.

BRIEF DESCRIPTION OF THE DRAWINGS

The detailed description of the preferred embodiment of the invention is made with reference to the accompanying drawing, in which.

DETAILED DESCRIPTION OF THE PREFERRED EMBODIMENT

Figure 1:
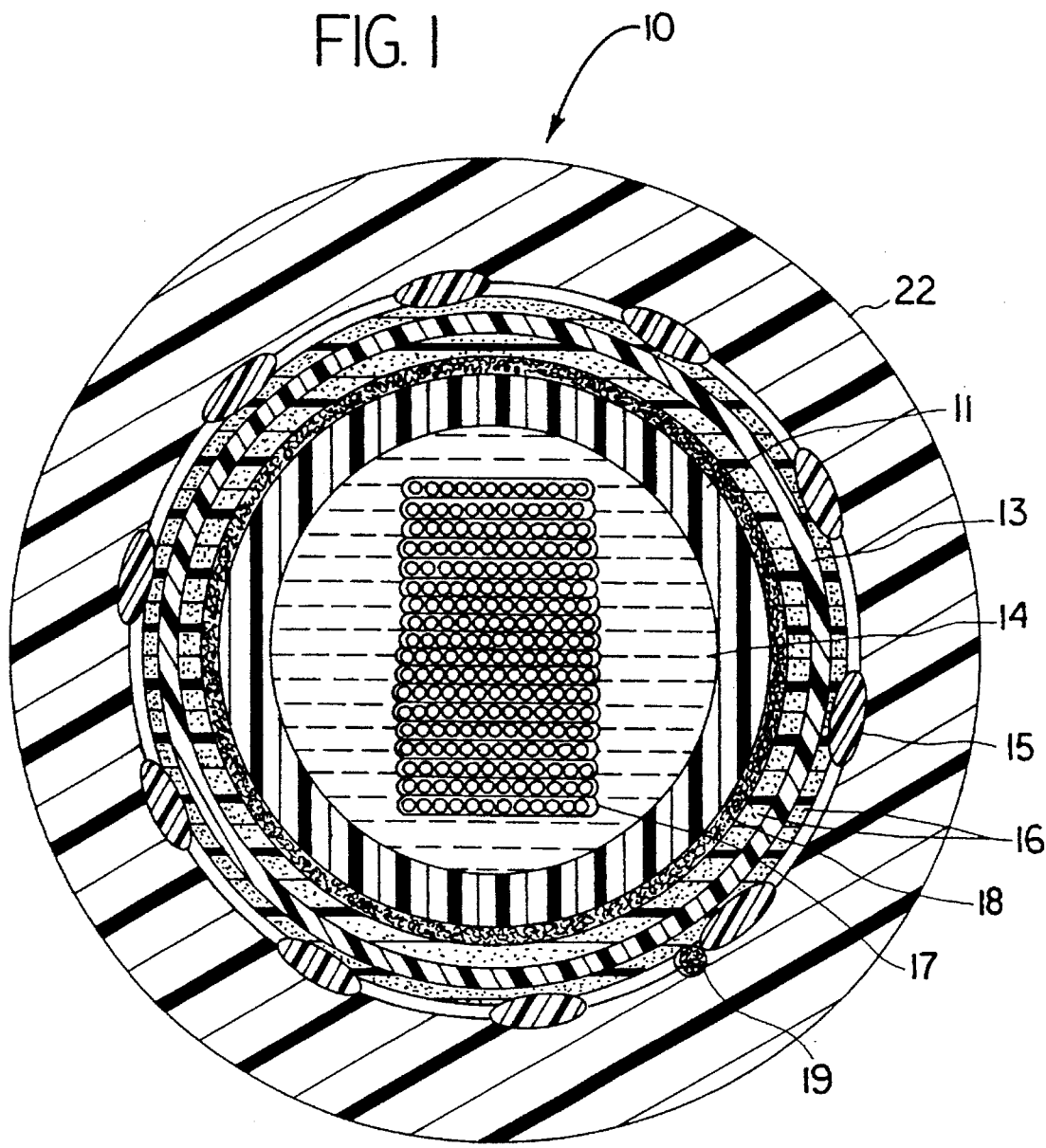
FIG. 1 is a cross-sectional view of a dielectric optical fiber service cable according to the invention.
Figure 2:
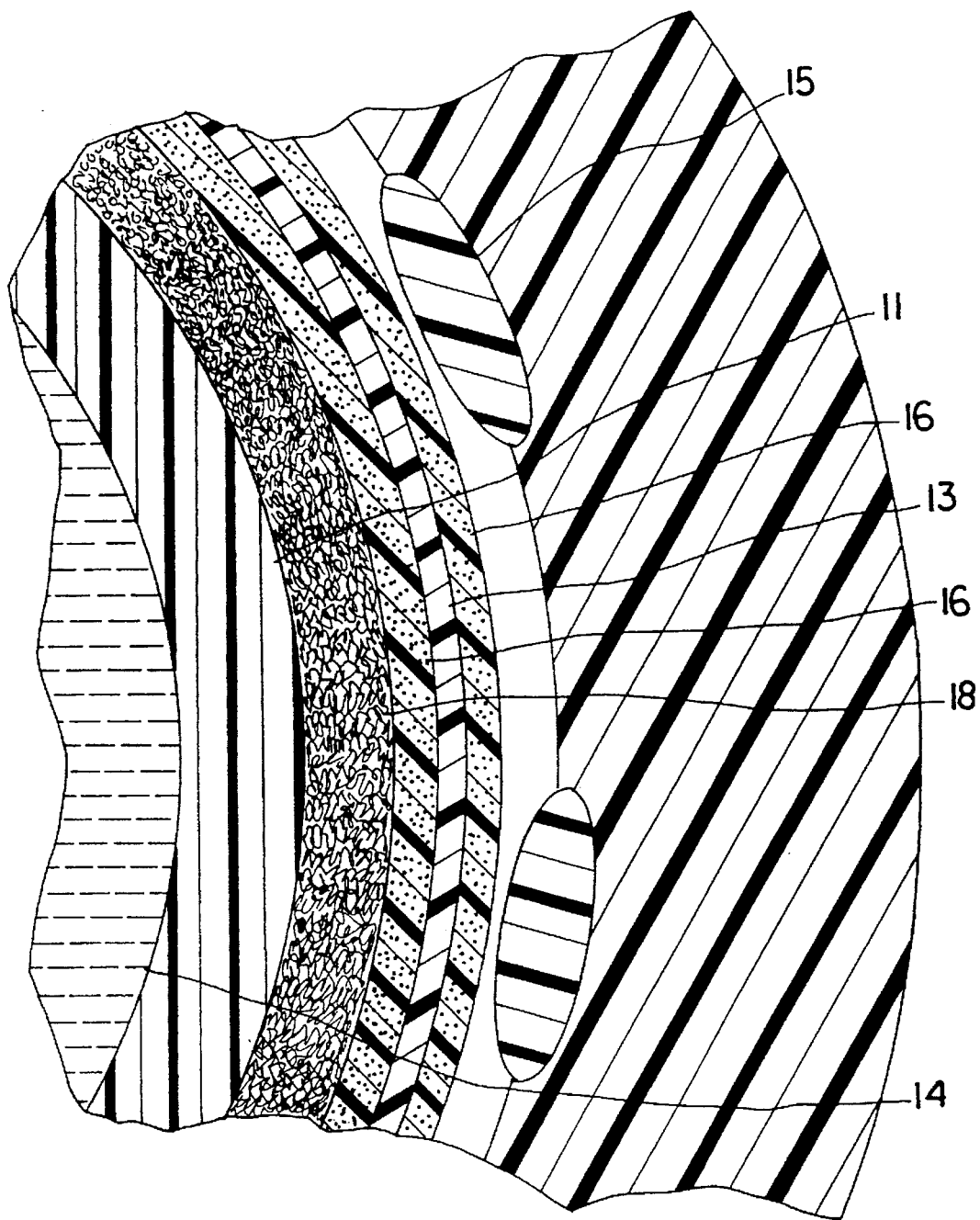
FIG. 2 is an enlarged view of a portion of the cable of FIG. 1.

FIG. 1 shows a dielectric cable designated generally by the numeral 10 and having a core which includes a stack of one or more optical ribbons 17. Each optical ribbon 17 comprises a planar array of a plurality of optical fibers each having a core and a cladding and having individual coatings as is well known to the art, the coated optical fibers in an array surrounded by a common coating which preferably is made of ultraviolet light curable material. In the preferred embodiment, each ribbon contains twelve optical fibers and the ribbon stack contains up to eighteen ribbons. The ribbon common coating material may be urethane acrylate.

Plastic core tube 11 in the preferred embodiment loosely holds the optical ribbon stack and is of a single layer construction made of polypropylene. Single layer tubes made of polybutylene terephthalate (PBT) or polyethylene also may be used. A dual layer construction with the outer layer made of PBT and the inner layer made of polycarbonate (PC) may be used as an alternative. The inner diameter of tube 11 may be 9.4 mm and its outer diameter may be 10.2 mm. Tube 11, as well as other plastic tubes 12 and 22, is made using crosshead extrusion. Tube 11 may be manufactured to have a length less than, equal to, or greater than the length of ribbons 17. A waterblocking filling compound 14 is inserted by a filling needle within tube 11. Filling compound 14 may be grease based gel-like material, or other filling compounds can be used as desired such as that disclosed in U.S. European patent application 484 744 A2, incorporated by reference, disclosing a filling compound comprising an oil and a flame-retardant material, including magnesium hydroxide and aluminum trihydrate, for optical cables.

Tensile strength members 18 are arrayed about core tube 11. Members 18 are made of aramid yarn, fiberglass, or impregnated fiberglass. Members 18 may be impregnated or coated with water swellable material. Members 18 may be helically stranded or stranded with reverse oscillating lay.

Surrounding members 18 is a spirally wrapped fire resistant tape 13, which is made of a material which may be a polyimide such as Kapton or fiberglass or Teflon, and may be 0.001 inch thick. Tape 13 may be between layers 16 of a water absorbent material, which may be in the form of longitudinally wrapped tapes, yarns, or loose powder. Surrounding tape 13 is layer of antibuckling members 15 contacting and coupled to outer jacket 22, which is pressure extruded over members 15. Antibuckling members 15 are made of impregnated yarn and may be obtained from Owens-Corning or Pittsburgh Paint and Glass. Flat glass-reinforced plastic or aramid fiber rods may also be used. Members 15 may be helically stranded or stranded with reverse oscillating lay.

Figure 3:
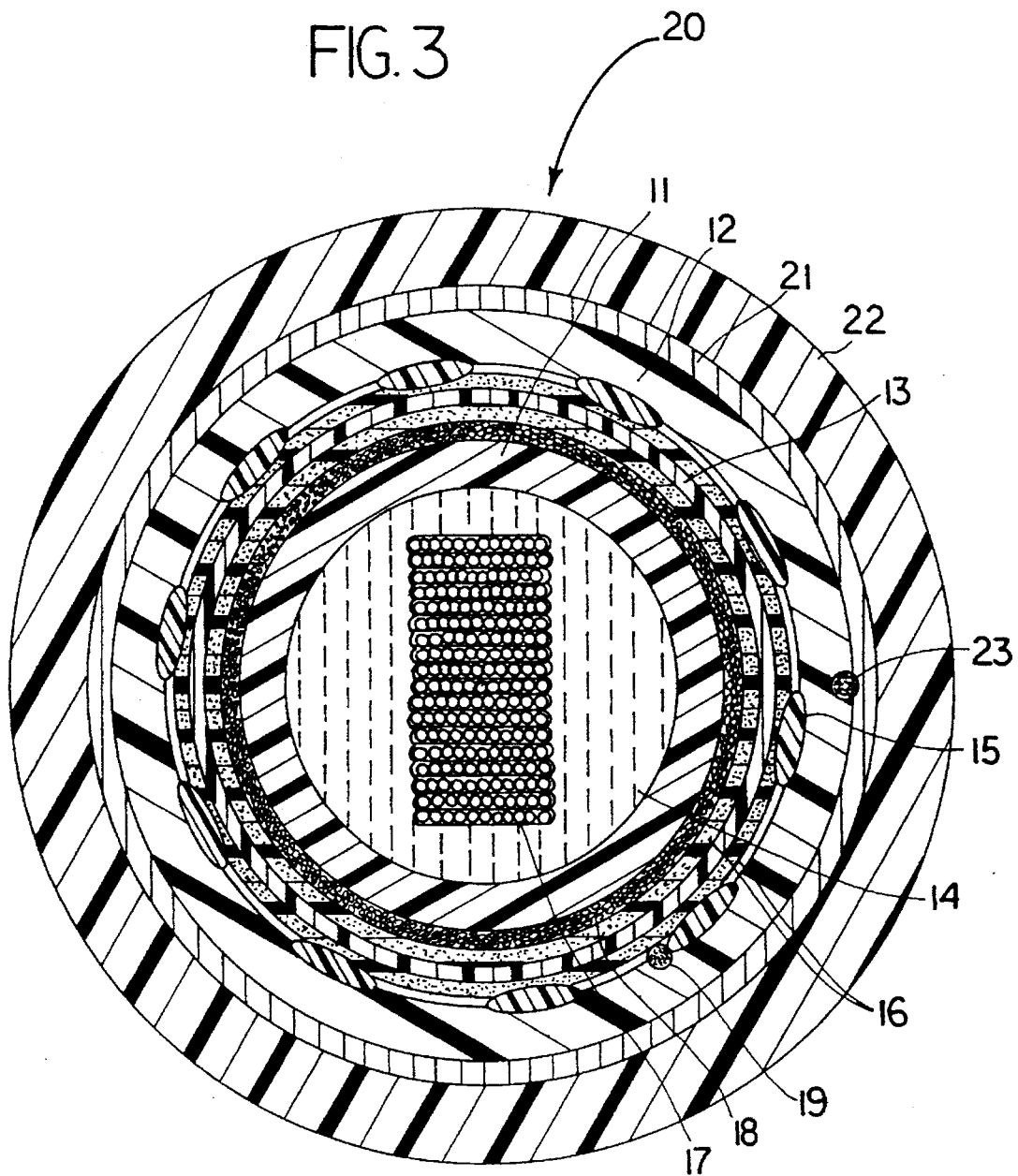
FIG. 3 is a cross-sectional view of an optical fiber service cable including a metallic layer.
Figure 4:
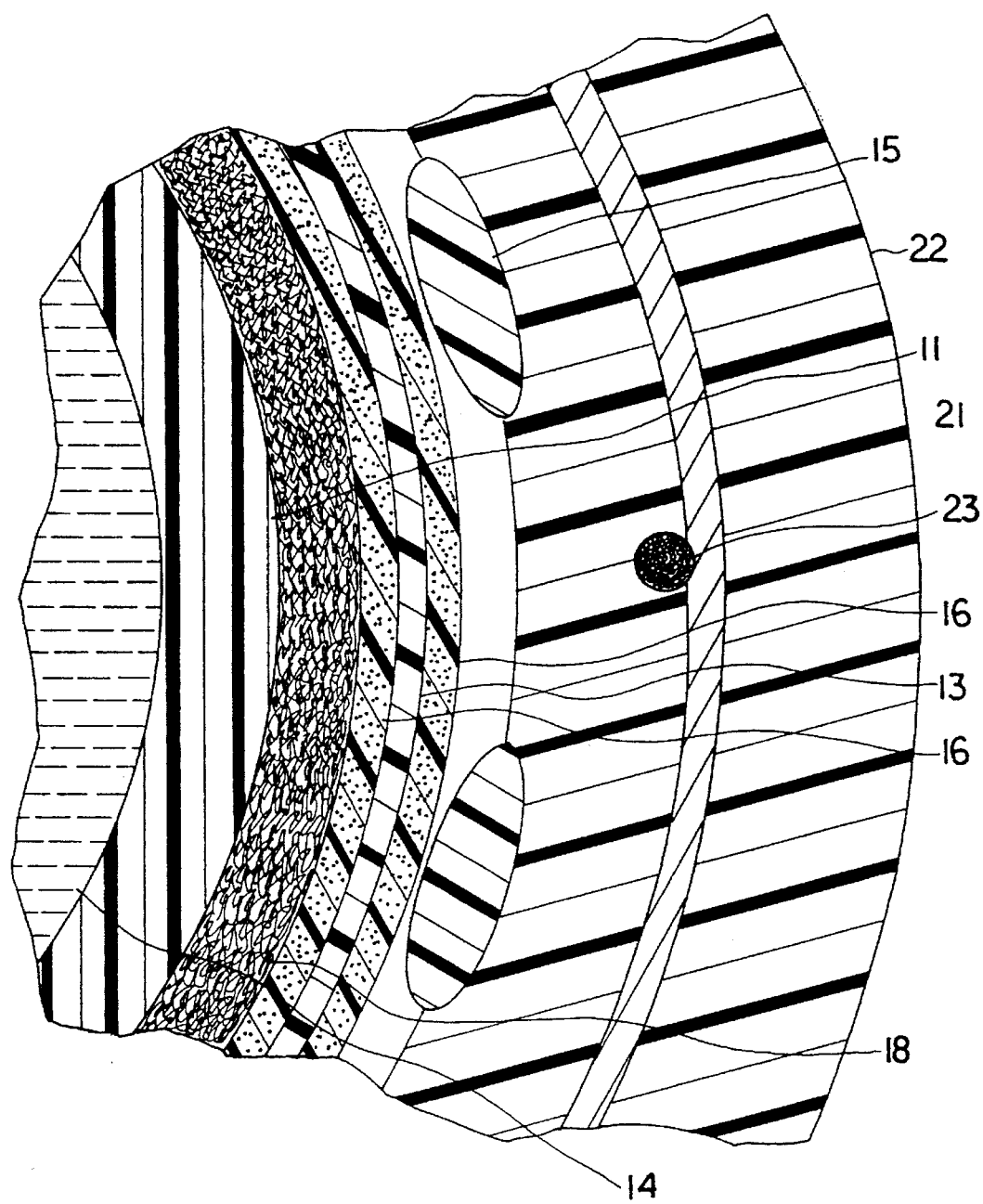
FIG. 4 is an enlarged view of a portion of the cable of FIG. 3.

Cable 10 has a flame-retardant outer jacket 22 which may be made from the material Gary Smokeguard II 6920, a flame retardant polyvinyl chloride, or a fluoropolymer such as PVDF or FEP. A rip cord 19 underlies jacket 22 of FIG. 1. FIGS. 3 and 4 show a cable 20, an armored version of cable 10. Metallic armor tube 21, which may be corrugated, surrounds an inner plastic polyethylene jacket 12, which need not be made of a flame retardant material. Water swellable powders or tapes may be added to the cable between tube 11 and jacket 12 if desired.

What is claimed is:

1. An optical fiber cable suitable for use as an optical service cable, comprising:

at least one optical fiber ribbon;

a core tube which is made of a plastic material and which encloses said at least one optical fiber ribbon; a waterblocking material which is disposed in the core tube;

an outer jacket which is made of a fire-resistant plastic material and which encloses said core tube;

a water absorbent material disposed between the core tube and the outer jacket; and, a plurality of strength members contacting the outer jacket and disposed between the core tube and the outer jacket.

2. The optical fiber cable of claim 1, further comprising a fire-resistant nonmetallic tape disposed between the core tube and the outer jacket.

3. An optical fiber cable, comprising:

at least one optical fiber ribbon;

a core tube which is made of a plastic material and which encloses said at least one optical fiber ribbon;

a waterblocking material which is disposed in the core tube;

an outer jacket which is made of a fire-resistant plastic material and which encloses said core tube; and, a plurality of strength members coated by or impregnated with a water absorbent material, the strength members disposed between the core tube and the outer jacket.

4. An optical fiber cable suitable for use as an optical service cable, comprising:

at least one optical fiber ribbon;

a core tube which is made of a plastic material and which encloses said at least one optical fiber ribbon;

a waterblocking material comprising a fire-resistant material, the water-blocking material disposed in the core tube;

an outer jacket which is made of a fire-resistant plastic material and which encloses said core tube; and a strength member system and a water absorbent material disposed between the core tube and the outer jacket.

5. The optical fiber cable of claim 4, wherein the waterblocking material comprises a gel-like material.

6. The optical fiber cable of claim 5, wherein the fire-resistant material comprises aluminum trihydrate.

7. The optical fiber cable of claim 4, wherein the fire-resistant material comprises magnesium hydroxide.

8. The optical fiber cable of claim 4, further comprising a nonmetallic fire-resistant tape disposed between the core tube and the outer jacket.

9. The optical fiber cable of claim 4, further comprising an inner tube made of a metallic material disposed between the core tube and the outer jacket.

10. An optical fiber cable suitable for use as an optical service cable, comprising:

at least one optical fiber ribbon and a waterblocking material;

a core tube which is made of a plastic material and which encloses said at least one optical fiber ribbon and waterblocking material;

an outer jacket which is made of a fire-resistant plastic material and which encloses said core tube;

a nonmetallic fire-resistant tape disposed between the core tube and the outer jacket; and a strength member system and a water absorbent material disposed between the core tube and the fire-resistant tape.

11. The optical fiber cable of claim 10, wherein the waterblocking material comprises a gel-like material.

12. The optical fiber cable of claim 11, wherein the waterblocking material comprises magnesium hydroxide.

13. The optical fiber cable of claim 11, wherein the waterblocking material comprises aluminum trihydrate.

14. The optical fiber cable of claim 10, further comprising a tube made of a metallic material disposed between the core tube and the outer jacket.

15. An optical fiber cable suitable for use as an optical service cable, comprising:

at least one optical fiber ribbon and a waterblocking material;

a core tube which is made of a plastic material and which encloses said at least one optical fiber ribbon and waterblocking material;

an outer jacket which is made of a fire-resistant plastic material and which encloses the core tube;

a nonmetallic fire-resistant tape disposed between the core tube and the outer jacket;

a plurality of antibuckling members disposed between the fire-resistant tape and the outer jacket; and, a strength member system and a water absorbent material disposed between the core tube and the fire-resistant tape.

* * * * *